United States Patent [19]

Malvern

[11] Patent Number: 5,136,668

[45] Date of Patent: Aug. 4, 1992

[54] FIBRE OPTIC GYROSCOPES

[75] Inventor: Alan R. Malvern, Devon, England

[73] Assignee: British Aerospace plc, London, England

[21] Appl. No.: 588,589

[22] Filed: Sep. 25, 1990

[30] Foreign Application Priority Data

Oct. 24, 1989 [GB] United Kingdom ............... 8923932

[51] Int. Cl.$^5$ .............................................. G02B 6/26
[52] U.S. Cl. ...................................... 385/27; 356/350
[58] Field of Search ................................ 356/349, 350; 350/96.15, 96.16, 96.29, 96.30; 385/27, 30, 39

[56] References Cited

U.S. PATENT DOCUMENTS

| 4,013,365 | 3/1977 | Vali et al. ...................... 356/350 |
| 4,291,984 | 9/1981 | Albares .......................... 356/350 |
| 4,323,310 | 4/1982 | Shaw et al. ..................... 356/350 |
| 4,573,797 | 3/1986 | Burns et al. .................... 356/350 |
| 4,637,025 | 1/1987 | Snitzer et al. ............ 350/96.15 X |
| 4,890,922 | 1/1990 | Wilson ........................... 356/350 |
| 4,915,503 | 4/1990 | Pavlath .......................... 356/350 |
| 4,952,059 | 8/1990 | Desurvire et al. ................ 356/350 |
| 5,050,183 | 9/1991 | Duling, III .................. 385/27 X |
| 5,056,096 | 10/1991 | Baker et al. ................. 385/27 X |

OTHER PUBLICATIONS

"An All Fibre Ring Resonator Gyroscope Using a Low Coherence Length Source", F. Farahi, K. Kalli, and D. A. Jackson, Physics Laboratories, University of Kent, Canterbury, Kent CT27NR, UK pp. 101–106, Springer Proceedings in Physics, vol. 44, Optical Fiber Sensors, 1989.

Primary Examiner—John D. Lee
Attorney, Agent, or Firm—Nixon & Vanderhye

[57] ABSTRACT

A fibre optic gyroscope including a fibre optic loop, a radiation source for generating a broadband signal, splitting means for splitting radiation from the source into two components and inserting them into the loop in clockwise (CW) and counter clockwise (CCW) directions, recombining means for recombining the components interferometrically to give an indication of rotation rate of the loop, characterized in that there is further provided amplification means for amplifying both components travelling within the loop.

2 Claims, 5 Drawing Sheets

FIBRE OPTIC GYROSCOPES

BACKGROUND OF THE INVENTION

1. Field of the Invention

The invention relates to improvements in fibre optic gyroscopes. Such devices, otherwise known as a fibre resonator gyros, comprise a fibre or fibres defining a resonator loop through which clockwise (CW) and counter-clockwise (CCW) components of radiation are passed. Both CW and CCW directions are maintained at resonance by a suitable control and the difference in frequency between the resonances is a measure of the rate of rotation applied to the gyro.

2. Discussion of Prior Art

Ideally such devices will have high sensitivity to changes in rotation rate, low backscatter and minimal Kerr effect. However, in practice it has proved difficult or even impossible to satisfy all these criteria simultaneously. For example, a fibre optic gyroscope of the ring resonator type which is characterised by having a relatively short loop of between, say, 10 and 30 meters and in which the light from a narrow band source passes around the loop a relatively large number of times, has the disadvantage of significant backscatter throughout the light path, although the sensitivity is relatively high. Furthermore, a fibre optic gyroscope of the reciprocal interferometer type which is characterised by having a relatively long loop of between, say, 300 and 1000 meters and in which the light from a broad band source passes around the loop a relatively small number of times, has the disadvantage of relatively low sensitivity, but does not suffer significantly from backscatter or the Kerr effect.

SUMMARY OF THE INVENTION

An object of the present invention is to provide a fibre optic gyroscope in which sensitivity is enhance but backscatter and the Kerr effect are kept to a minimum.

According to one aspect of the present invention there is provided a fibre optic gyroscope including a fibre optic loop, a radiation source for generating a broad band signal, splitting means for splitting radiation from the source into two components and inserting them into the loop in clockwise (CW) and counter-clockwise (CCW) directions, re-combining means for re-combining the components interferometrically to give an indication of rotation rate of the loop, characterised in that there is further provided amplification means for amplifying both components travelling within the lop.

Preferably the amplification means includes a laser radiation source and coupling means associated with the loop whereby radiation from the laser source provides gain in both the CW and CCW components.

BRIEF DESCRIPTION OF THE DRAWINGS

Reference will now be made, by way of example, to the accompanying drawings in which.

DETAILED DISCUSSION OF PREFERRED EMBODIMENTS

Figure 1:
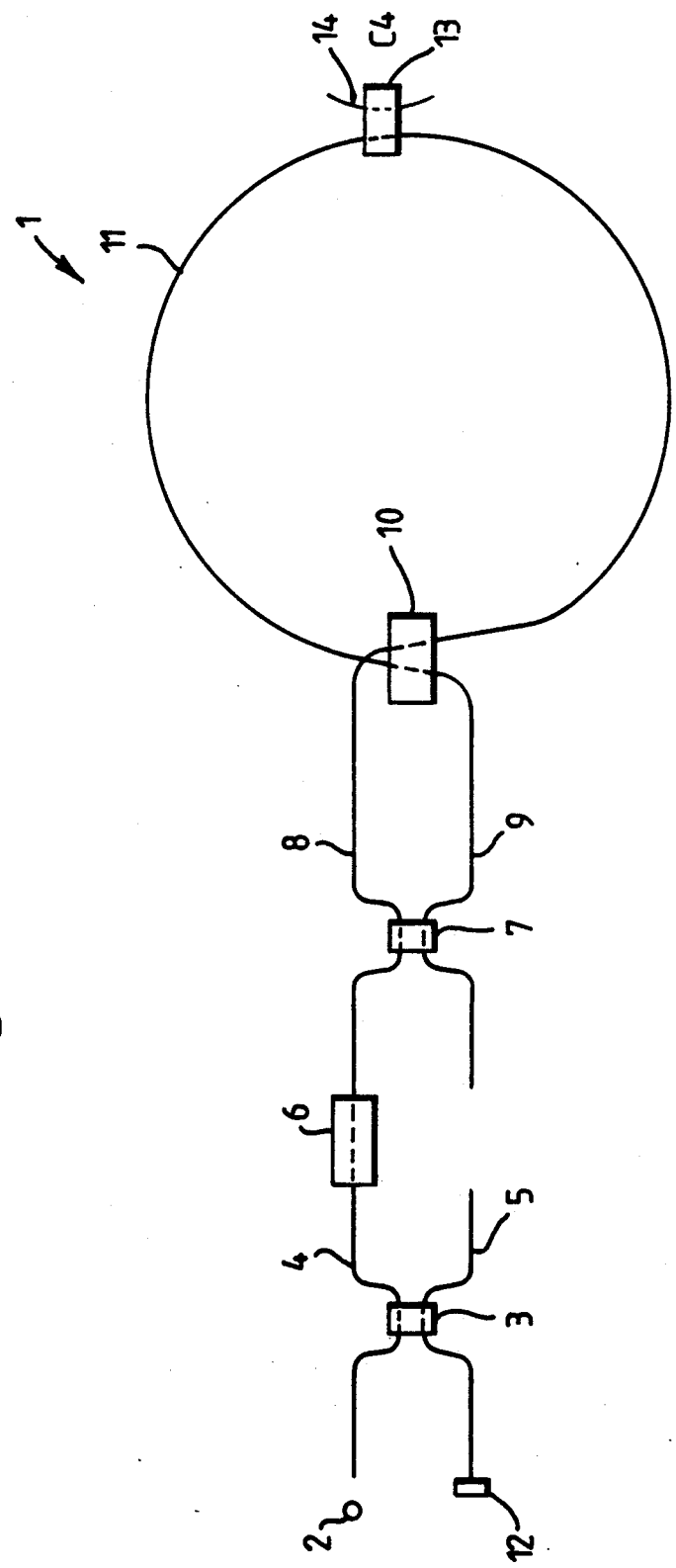
FIG. 1 is a schematic drawing of a fibre optic gyroscope according to the invention.

The illustrated gyroscope is shown generally at 1. A broad band source 2 provides radiation, at say 1.06 μm, which is transmitted through a first coupler arranged to split the radiation in to two halves 4 and 5, one of which, 4, is then passed through a mode filter 6 to a second coupler 7. Again the radiation is split into two halves 8 and 9 both of which are then passed through a third coupler 10 into a loop of say neodymium fibre 11. The loop may be any length between, say, 300 and 1000 meters.

After the radiation is split at coupler 10, two equal coherent components are caused to travel in CW and CCW around the loop. The two component then interferometrically re-combined at coupler 10 before being passed back to a detector 12 via the couplers 7 and 3. The components will only combine interferometrically where they have experienced the same number of transits around the fibre loop. Each interferometrical combination, for a given pair of coherent components, are added together to give any intensity dependance on rate $\Omega$ I ($\Omega$) given by:

$$I(\Omega) = \frac{Io\, \gamma^2 (1 - r^2)(\cos \Omega - \gamma^2 r^2)}{(1 - 2\gamma^2 r^2 \cos \Omega + \gamma^4 r^4)}$$

Where
$\gamma$ = Transmission coeficient of light
$r$ = Coupling ratio of coupler 11
$Io$ = Source intensity The sensitivity of the response to rate of the gyroscope is given by:

$$\frac{\delta I}{\delta \Omega} = \frac{T \sin \Omega}{1 - \alpha \cos \Omega + \beta} \cdot \frac{(1 + \alpha(\cos \Omega - \delta))}{(1 - \alpha \cos \Omega + \beta)}$$

Where
$\alpha = 2\gamma^2 r^2$
$\beta = \gamma^4 r^4$
$\delta = \gamma^2 r^2$
$T = 0.5\, \gamma^2 (1 - r^2)^2$ When using typical values for $\gamma$ and $r$ and evaluating at the peak value, then it is found that there is a reduction in sensitivity of the gyroscope compared with that which would normally be expected.

If gain is introduced into the fibre loop 11, then the transmission of the coupler 10 and the transmission loss to the fibre itself can be compensated, as long as $\gamma r \leq 1$.

The reason for this is that if $\gamma r > 1$ then undesired self-sustained laser oscillation will result. However, by having $\gamma r < 1$, but always close to 1, there can be a considerable improvement in sensitivity over a conventional gyroscope system.

The gain is introduced by providing a dichroic coupler 13 in association with the loop 11. The dichroic coupler is fed with pump radiation at say 820 nm from a laser source 14, and causes the radiation to enter the loop with a high efficiency. The radiation at wavelength 1.06 μm (i.e., the broadband source) is transmitted through the coupler 13 without attenuation i.e. r→1 at 820 nm and r→0 at 1.06 μm. A neodymium doped fibre with gain at 1.06 μm is spliced into the loop so that the pump light at 820 nm gives rise to a controlled amount of gain within the loop.

The user of the neodymium doped fibre in such a scheme gives rise to a broad band gain which will be reciprocal. Further advantages are as follows:

a) A broadband source can be used for the gyro with a thermal wavelength distribution to eliminate Kerr effects. Also polarisation errors are eliminated and backscatter effects are significantly reduced. These are effects which are shared with the fibre optic gyro.

b) The gain will tend to be polarisation sensitive depending on the orientation of the polarisation of the pump. If the gain depends on polarisation and this is aligned to the correct fibre axis the effect will be to suppress the unwanted polarisation which will not seen the sensitivity increase.

c) There is no need for path length control (as in the ring resonant gyro) as successive round trips of light are incoherent with respect to one another.

d) As lasing action does not occur the gain will not saturate so there should be no mode competition effects between the two directions, as the system is working in a linear region of gain. The gain should be matched in the two directions, which will eliminate the effects of differential mode pulling (causing a gyro bias) due to different refractive indexes in the two directions.

Figure 2:
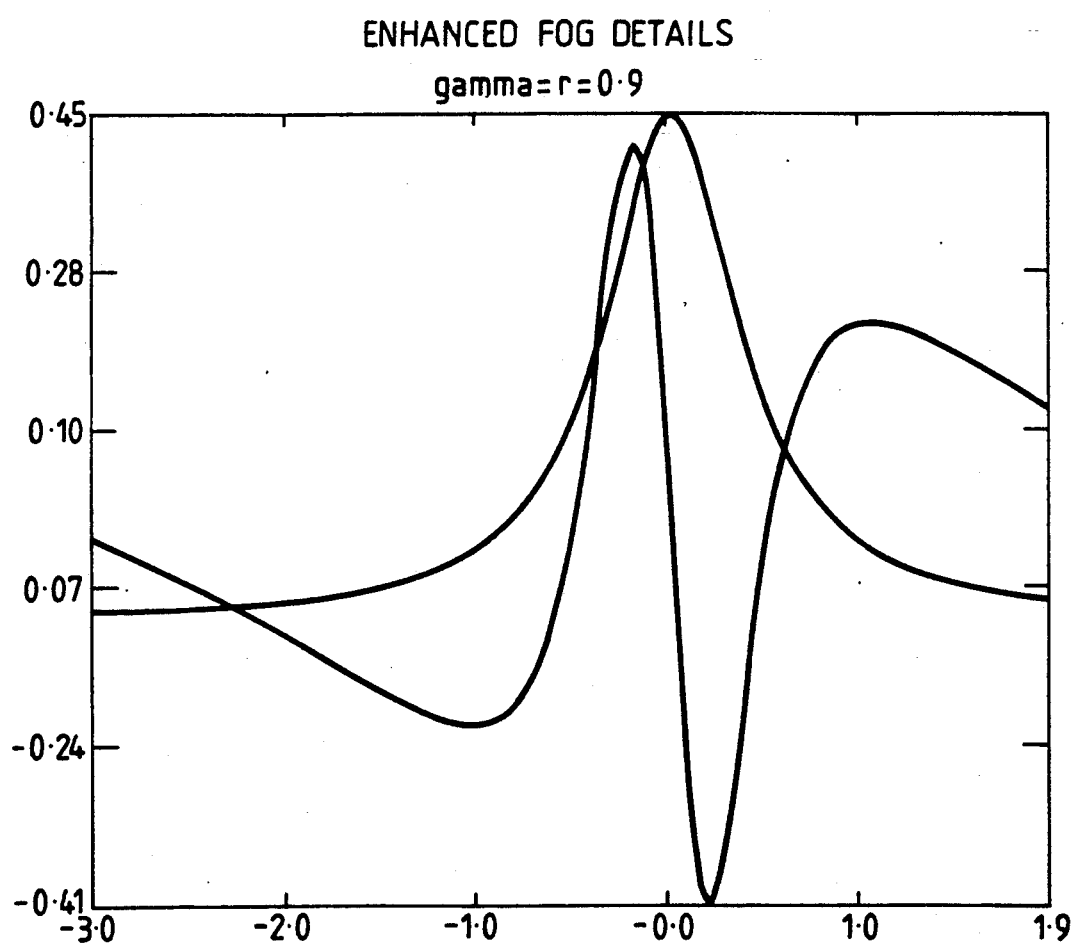
FIGS. 2 and 3 are graphs for showing the intensity of light in a fibre optic coil and the sensitivity of typical known gyroscopes.
Figure 3:
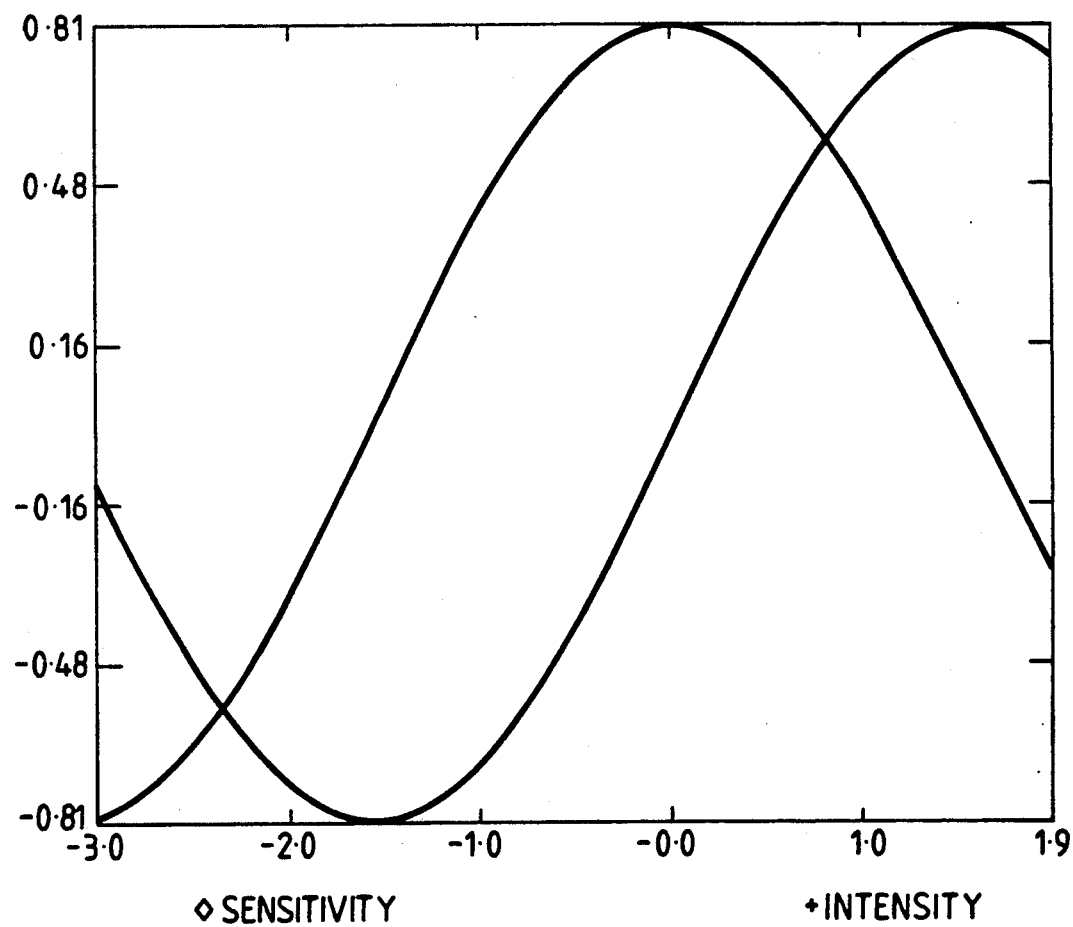

FIGS. 2 and 3 show typical fibre optic gyroscope intensity and sensitivity characteristics for two different $\gamma r$ values, for FIG. 2 $\gamma r = 0.81$ and for FIG. 3 $\gamma r = 0.045$. On comparison of the graphs, we can see that for a typical fibre optic gyroscope by increasing $\gamma r$ there is narrowing of the peaks, but a reduction in sensitivity and intensity.

Figure 4:
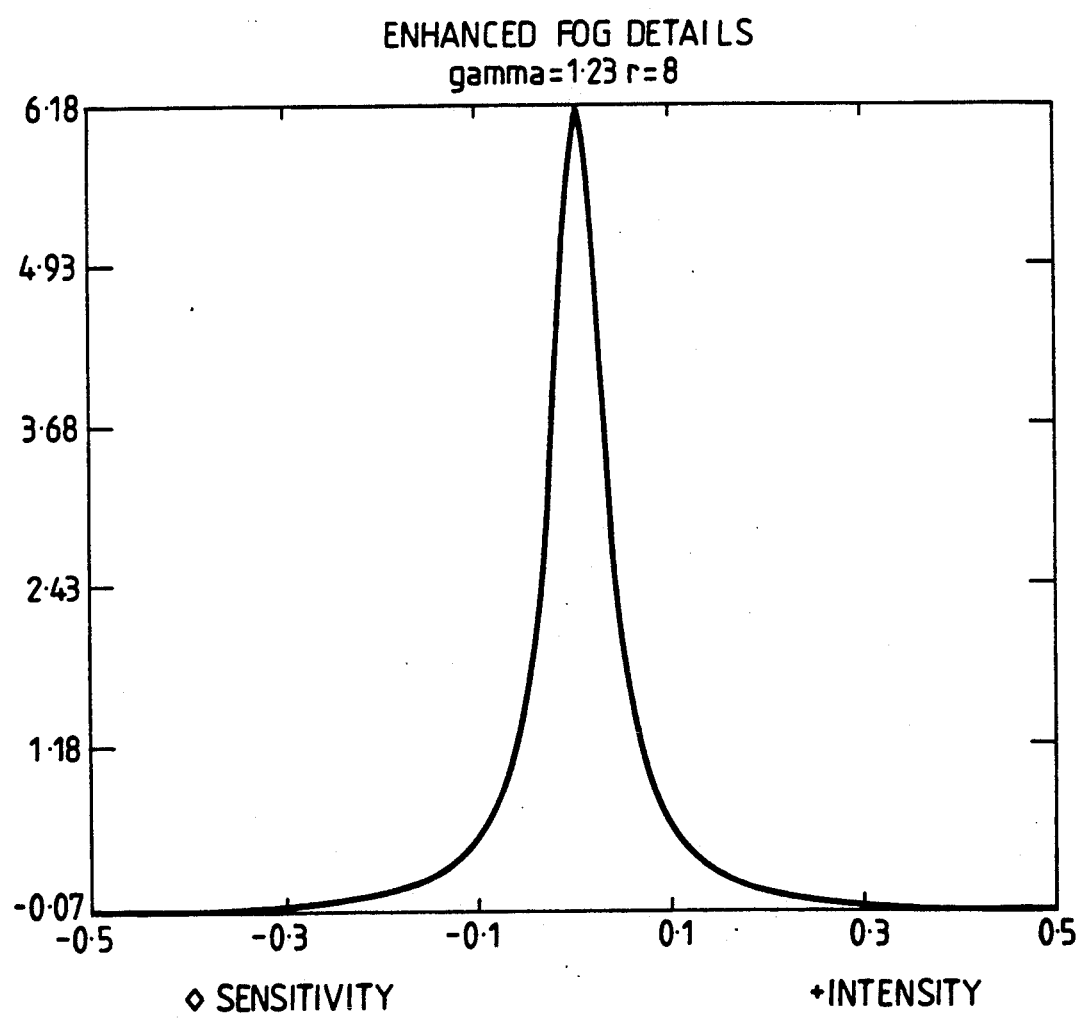
FIGS. 4 and 5 are a similar graph for the gyroscope of FIG. 1.
Figure 5:
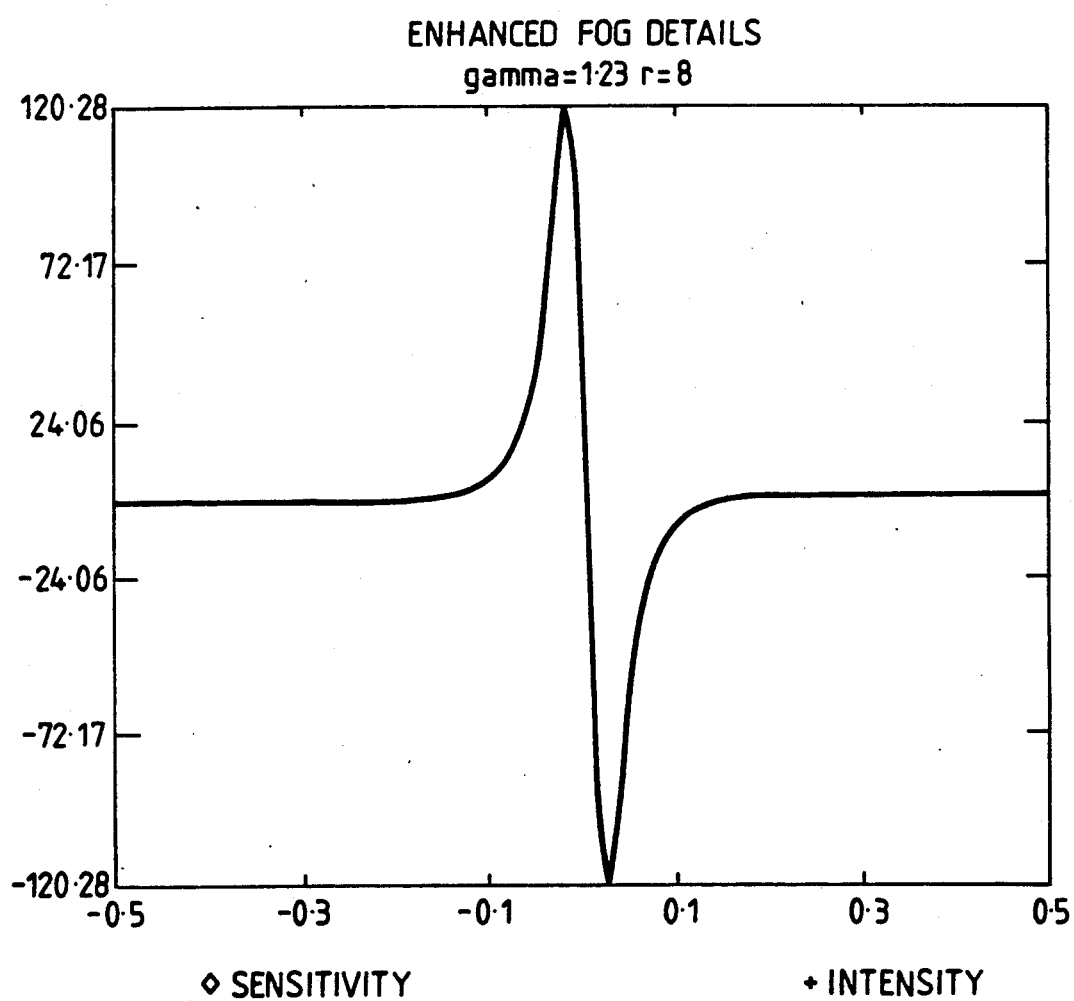

By introducing a gain as described above the characteristics are as shown in FIGS. 4 and 5. For a high value of $\gamma r$, namely $\gamma r = 0.88$ the intensity is increased by, about, a factor of 4, and more significantly the sensitivity of the gyroscope is increased by a factor of over 100.

A value of gain of about 30% per round trip is required to maintain the value of $\gamma r = 1$ however the exact value will vary depending upon the values of $\alpha$ and r chosen. Different situations will dictate that different values of $\alpha$ and r be chosen.

The pump laser may require regulation during operation of the gyroscope to inhibit lasing occurring. This may be achieved by regulating the pump in response to the detectors responses by means of a feedback loop.

It should be noted that the pump laser and dichroic coupler may be replaced by other suitable index matched gain media as long as there is no likelihood of back reflection.

It should further be noted that for different broadband sources, different pumped lasers may be required, e.g. it is possible to use Erbuim doped fibre to give gain in a source at 1.550 nm by using a pump at 988 nm.

I claim:

1. A fiber optic gyroscope comprising:

a fiber optic loop having clockwise and counterclockwise directions, a radiation source for generating a broadband signal, splitting means for splitting radiation from the source into two components, means for inserting said two components into said loop in clockwise (CW) and counterclockwise (CCW) directions, recombining means for recombining the components interferometrically to give an indication of rotation rate of the loop, and amplification means for amplifying both components travelling within the loop, in which said amplification means includes a laser radiation source and a coupling means, responsive to said laser radiation and associated with the loop, for providing gain in both the CW and CCW components.

2. A fiber optic gyroscope comprising:

a fiber optic loop having clockwise and counterclockwise directions, a radiation source for generating a broadband signal, splitting means for splitting radiation from the source into two components, means for inserting one of said two components into said loop in a clockwise (CW) direction and the other of said two components into said loop in a counterclockwise (CCW) direction, recombining means for recombining said components interferometrically to give an indication of rotation rate of the loop, laser means for providing pump radiation at a wavelength, and dichroic coupler means for providing said pump radiation to said loop, said loop, said laser means and said coupler means comprising a means for amplifying both components travelling within the loop.

* * * * *